UNITED STATES PATENT OFFICE.

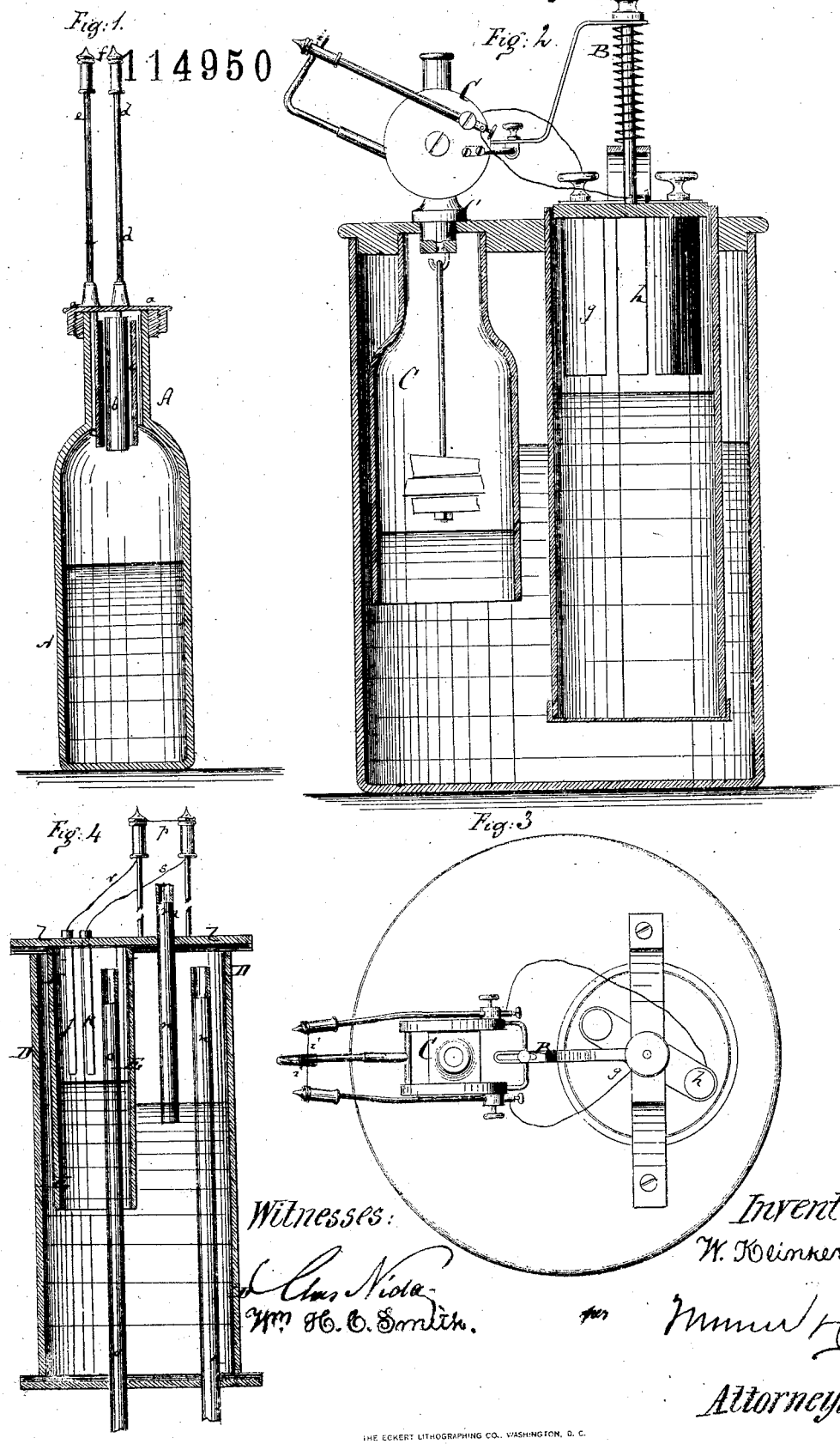

WILHELM KLINKERFUES, OF GÖTTINGEN, PRUSSIA.

IMPROVEMENT IN APPARATUS FOR IGNITING GAS AND OTHER LIGHTS.

Specification forming part of Letters Patent No. 114,950, dated May 16, 1871.

*To all whom it may concern:*

Be it known that I, WILHELM KLINKERFUES, of Göttingen, in Prussia, have invented a new and Improved Apparatus for Igniting Gas and other Lights; and I do hereby declare that the following is a full, clear, and exact description thereof, which will enable others skilled in the art to make and use the same, reference being had to the accompanying drawing forming part of this specification, in which—

Figure 1 represents a sectional elevation of my improved portable gas lighting apparatus. Fig. 2 is a sectional elevation of a self-lighting lamp. Fig. 3 is a plan or top view of the same. Fig. 4 is a sectional elevation of the street gas-lighting apparatus.

Similar letters of reference indicate corresponding parts.

This invention relates to a new apparatus for igniting gas-lights or lamps, of suitable kind, by the simplest application of well-known electric principles and mode of action.

The invention consists chiefly in the arrangement of a vessel containing a liquid, which, when brought in contact with a pair of galvanic plates suspended within said vessel, will close an electric circle and produce a current, whereby a piece or pieces of platinum wire, held in electrodes that connect with the said galvanic plates, will be excited to produce catalytic action and ignite combustible matter with which they may be brought in contact.

The catalytic effects of platinum in its spongy, pulverous, or porous state have been frequently proposed as a means of lighting gas and other flames; but, if the short-lived success of the Doebereiner apparatus be excepted, no practical results have as yet been attained.

In these peculiar forms platinum is too liable to change to admit of the long and frequent use required by the exigencies of domestic applications, at least in any of the manners hitherto proposed. Nor does, in fact, spongy platinum, freshly prepared, ignite our common illuminating-gas.

These considerations lead naturally to the idea of employing more durable forms of platinum, such as wire or plate, and producing the same catalytic power by means that will not be subject to new objections. Still, there do not thus far seem to have been any proposals or experiments brought forward in this direction.

The experiments undertaken by your petitioner for the purpose of ascertaining the temperature at which compact platinum, brought into the shape of wire or plate, acquires sufficient catalytic power to ignite illuminating-gas, showed that not even a red heat was required.

A platinum wire inserted between the poles of a very small galvanic pair of zinc and graphite, without showing the slightest emission of light in the dark, ignited a jet of gas almost instantaneously.

It is evident, in this case, as the red heat of the wire is only an effect of catalytic action, that the galvanic circle is acting in a very different manner from the former methods, which effect ignition by the direct action of the electric spark.

This circumstance, and the hydraulic closing of the galvanic circle, are the principal characteristics of the new contrivances, whose practical value has been tested by numerous experiments; for if a stronger action of the galvanic current were required the power of the battery would be exhausted in a far shorter time; and, indeed, it would be impossible to employ an apparatus of small interior resistance, such as zinc and graphite, with a solution of bichromate of potassa and sulphuric acid, or chloride of silver and zinc with a solution of salt, for months without renewing the filling.

At the same time the hydrostatic manner of closing and breaking the galvanic circle affords the easiest and simplest means of instantly producing the desired catalytic action, and afterward stopping it again at will, for the sake of economizing the materials.

On this principle of imparting catalytic power to platinum in its compact forms, by means of the galvanic current, I have had several kinds of gas-lighting contrivances constructed, for which I request the protection of a patent.

The first apparatus, represented by Fig. 1, consists of a thin, hollow glass cylinder, A, of suitable size, closed at the bottom, and covered by a plate, a, bearing on the inside the galvanic pair of zinc and graphite plates b and c, of small size.

These plates b c are respectively connected with the electrodes d and e, that project from the outside of the plate a, holding the inserted bit f of platinum wire.

The liquid filling consists preferably of the well-known mixture of bichromate of potassa and diluted sulphuric acid, which will be active for a long time.

In order to light gas-flames for domestic purposes with this simple apparatus it is only necessary to incline it sufficiently, and at the same time hold the platinum wire before the jet of the gas that escapes from the burner. But when the apparatus is placed upright, the plates not touching the liquid, no galvanic action takes places, and consequently no material is consumed by electric action, so that a mixture of the value of a few cents suffices for many thousand repetitions of the operation.

When the mixture is comparatively fresh the platinum wire becomes so far red hot as to ignite a paper match impregnated at one end with chlorate of potassa.

The second application of the same principle, indicated by Figs. 2 and 3, is intended to supply a kindling apparatus for rooms not furnished with gas.

An apparatus, C, constructed on Doebereiner's principle for the evolution of hydrogen gas is worked by the pressing down of a lever, B, which causes at the same time a small galvanic pair of zinc and graphite plates, g h, to be immersed in a mixture of bichromate of potassa and sulphuric acid, and thus excites catalytic power in a platinum wire, i, exposed to the hydrogen-gas jet.

The working of this apparatus is very reliable, which renders it far preferable to Doebereiner's machine with platinum in the spongy form.

The third of the proposed contrivances, (shown in Fig. 4,) is intended to be applied to street gas-lights for the purpose of simultaneously lighting and extinguishing a number of lamps from a single station with the smallest possible loss of gas or other material.

Before describing this apparatus the following remarks are in place:

Important reasons forbid that the foremost shutting off of the gas-supply should be placed far back of the mouth of the burner, and make it necessary to devise some means for opening and cutting off the supply from a distance.

At first sight the simplest way to effect this would seem to be by stop-cocks, connected with electro-magnets, to be worked by galvanic action from a common station. But, in the first place, it would hardly be possible to guard against loss of gas and the entrance of atmospheric air into the pipes.

Another consideration presents itself in the fact that galvanic batteries intended for the production of caloric must be of weak resistance, and are, therefore, incompatible with great lengths of conducting-wires, as well as long duration of galvanic action, if a frequent renovation of the filing is to be avoided.

It is, therefore, proposed to furnish each lamp-post with its own galvanic apparatus, and to make the galvanic pair touch the liquid only during the short time of lighting up.

These conditions seem to be met in the most practical and applicable manner by the following arrangement. (Represented in Fig. 4.)

An hermetically closed vessel, D, is provided with a compartment or bell, E, open at the bottom, so as to communicate with the main vessel, and having a galvanic pair of zinc and graphite, j k, fixed to the cover l, in such a manner that the solution of bichromate of potassa with sulphuric acid, contained in the lower part of the vessel D, is not reached by them when the apparatus is in its usual inactive state.

The pipe m, leading to the burner of the gas-flame, passes air-proof through the cover of the vessel D, and is immersed in the liquid, as shown, thus shutting off the outward air from communication with the upper part of D.

The latter is filled above the aforesaid liquid with illuminating-gas supplied from the gas-works by the pipe n; and as the pipe m is of sufficient length to hold the hydrostatic column raised by the small and nearly constant pressure usual in gas-pipes, it takes the place of the last stop-cock in the supply-pipe.

By another pipe, o, leading to the compartment E, from a station at any required distance, the air in the upper part of E can be rarefied, and thus the liquid in E sucked up, lowering the surface in A so that the escape of the gas through m is first opened and then, on continued suction, the zinc and graphite plates in B are reached by the liquid.

At this point the galvanic circle is closed, and the platinum wire p, over the mouth of m, being inserted between the conducting wires r s from j k, becomes heated, and acquires sufficient catalytic power to kindle to a flame the hydrogen contained in the gas-jet.

After this is effected a slight remission of the sucking-power in the pipe n is made to sink the level in E below the galvanic plates j k, in order to avoid unnecessary exposure, but without shutting off the escape of the gas through m.

In order to make sure of this effect on all the lamps, a model apparatus must be placed at the station, corresponding in all respects to those of the lamps.

The putting out of the light is effected by opening the sucking-pipe o to the access of atmospheric air, thus restoring the previous state of equilibrium, and at the same time preventing differences of temperature in different parts of the sucking-pipes to cause partial suckings, and thus stop the correspondence in the working of the apparatus on the different lamps.

This apparatus may be attached to any ordinary gas-pipe, and as easily removed, when required, for the purpose of a revision.

Lamps that are not intended to be lighted regularly may be furnished with a greater quantity of liquid in D and E, so as to be lighted up with the others, but extinguished again immediately after, while the other lamps continue to burn.

To guard against interruption in the hydraulic connection of the galvanic circle by the effect of low winter temperature, in either freezing the water of the filling or causing the bichromate of potassa to be crystallized from the solution, it is necessary to employ, during the winter months, a solution containing a greater quantity of sulphuric acid and less of the chromate, a mixture that practically is best prepared on cold winter days.

In places having separate gas mains for the street-lamps, such as exist in some cities, the sucking-pipe of the apparatus may be left out entirely by subjecting the gas to three different degrees of pressure—the lowest of these pressures to effect the hydraulic closing of the escape-pipe; the second to let the gas open its way to the burner; and the strongest pressure to force the liquid in E so far up as to cause the galvanic circle to be closed, and effect the ignition; but inasmuch as the two lower pressures may be made to differ very little, and as the strongest pressure is employed only during a few seconds, the same simplified method may be employed, even when the conducting-pipes are not separated, and the lighting of the street-lamps will for a few moments affect the private gas-lights, the sole effect of this being a momentary increase of the flame, that may even be entirely averted by the application of a governor.

The last-mentioned apparatus, with the hydraulic shutting of the supply, may also find various domestic applications, such, for instance, as the lighting up of one or more gas-lights, or whole chandeliers, at once, by the mere pressure on a knob in the wainscot. But as the special arrangement in this case must necessarily vary as occasion requires, no description of details can be given.

As to the safety of all the proposed contrivances, they have been tested by numerous experiments and found to be perfectly reliable.

Having thus described my invention, I claim as new and desire to secure by Letters Patent—

1. The igniting apparatus, consisting of a vessel that is partly filled with an exciting liquid, and provided with a pair of galvanic plates, and operating in such manner that when the liquid is brought in contact with the plates a piece of platinum connected with the plates will be excited to produce catalytic action and ignite combustible matter with which it is brought in contact, as set forth.

2. The vessel D, provided with the bell E, galvanic plates $j$ $k$, and pipes $m$, $n$, and $o$, to operate substantially as herein shown and described.

The above specification of my invention signed by me this 16th day of January, 1871.

WILHELM KLINKERFUES,
*Professor in Göttingen.*

Witnesses:
WILHELM AUGUST NIPPOLDT, *Dr. Phil.*
KARL ENGELHARD.